June 8, 1965        F. ZANDMAN        3,187,623

METHOD OF MODEL PHOTOELASTICITY ANALYSIS

Original Filed April 2, 1957

INVENTOR.
Felix Zandman
BY
ATTORNEY

United States Patent Office — 3,187,623 — Patented June 8, 1965

3,187,623
METHOD OF MODEL PHOTOELASTICITY ANALYSIS
Felix Zandman, Villanova, Pa., assignor, by mesne assignments, to The Budd Company, Philadelphia, Pa., a corporation of Pennsylvania
Application Dec. 22, 1960, Ser. No. 72,838, which is a continuation of application Ser. No. 650,250, Apr. 2, 1957, now Patent No. 3,034,395. Divided and this application Nov. 17, 1961, Ser. No. 153,158
Claims priority, application France, Nov. 26, 1956, 726,402
1 Claim. (Cl. 88—14)

This application is a division of pending application Serial No. 72,838 now abandoned, filed December 22, 1960, and said pending application is a continuation of my prior application Serial No. 650,250 now Patent No. 3,034,395, filed April 2, 1957.

The invention relates to photoelastic stress analysis and, more particularly, to novel methods useful in model photoelasticity.

The term "photoelastic material" as used herein refers to material which exhibits changes in optical properties when subjected to stresses, i.e., when in the unstressed condition these are isotropic and become anisotropic when stressed. These materials are usually isotropic, transparent or translucent, dielectric materials which are generally long-chain polymers and include, but are not limited to, epoxy resins, i.e., resins having the general chemical formula:

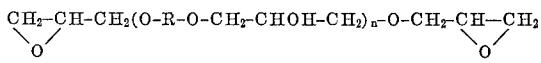

wherein R represents an aromatic group, polyvinyl acetate, cellulose sheet material, polymers of methyl methacrylate, polyesters, urea-formaldehyde and melamine-formaldehyde resins, and gelatins.

A photoelastic element may be bonded to an adjacent layer of material by suitable known light-transmitting adhesives compatible with the materials to be bonded, or in some instances, by softening one or both of the materials as by a solvent or by heating to render it or them adhesive. Some photoelastic materials may become unitarily bonded to the adjacent surface when initially deposited in liquid condition, followed by solidification at ordinary temperatures.

Linearly or circularly polarizing material may constitute a plate bonded to the photoelastic plate, or may comprise a film coated over said plate by any suitable coating or laminating process. A sheet element of the type sold by the Polaroid Corporation may be used, it being bonded adhesively or otherwise to the photoelastic plate.

The resulting dual system may be produced in laminates of large surface area and a reflecting coating may be provided thereon as by spraying or otherwise bonding a coat of aluminum paint. Detecting units may then be produced by cutting the laminate to the desired shapes and sizes depending on the uses contemplated therefor.

Illuminating light rays become polarized on passing through the polarizing element bonded to the plate and hence are modified on passing through the birefringent plate to an extent depending on the deformation of said plate, and the resulting modification is apparent when the reflected light is viewed through the polarizing element acting as an analyzer.

The modification including the circular polarizing plate is desirable in those cases where the directions of the main stresses are not known in advance; the unit will then make color patterns visible regardless of the orientation of said directions.

According to this invention, therefore, the model photoelasticity methods of stress analysis for the prediction of a workpiece stress-strain reaction to a workpiece loading condition comprise the steps of first laminating together a sheet of polarizing material and, in its isotropic condition, a sheet of photoelastic material to form a unitary testpiece blank, thereafter conforming a portion of said blank to represent the workpiece, and subjecting the conformed portion directly to a loading condition proportional to the workpiece loading condition.

The invention will be better understood from a consideration of the following description in conjunction with the accompanying drawing, illustrating various embodiments of the invention;

Figure 1:
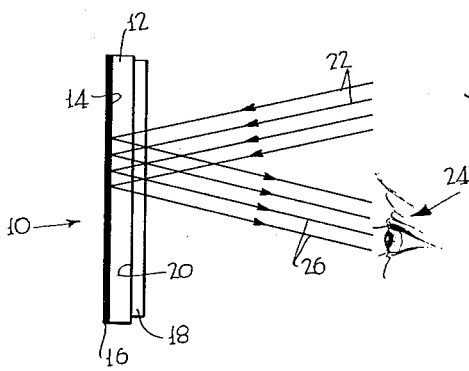
FIG. 1 is a side elevation of a preferred embodiment.

The assembly of the invention generally designated 10 comprises a transparent photoelastic plate 12 having its rear face 14 metallized or coated with reflective paint as indicated at 16. The plate 12 has a strip 18 of polarizing material bonded to its front face 20. The assembly is illuminated with incident light rays indicated by the arrows 22, and for effecting an observation or test the observer's eye indicated at 24, is positioned in the path of the light rays 26 reflected from the metal-coated face 14.

The composite assembly according to the invention comprising a reflector, a photoelastic plate and an overlying polarizing element is applicable for model stress analysis. The plate will then be cut out in accordance with the contour which is to serve as the model; thus the model will comprise both the photoelastic material and the measuring means, namely the polarizing material and reflector, incorporated in a single mechanically unitary assembly.

The invention further includes a form of embodiment in which the photoelastic plate instead of being bonded with one sheet of polarizing material is bonded with two sheets of such material on opposite sides of it so as to provide a sandwich-like structure. Such an assembly will be viewable in transparency rather than reflection, and may serve for such purposes as the determination of the directions of the main strains by observing the isoclinic fringe lines therein, and determinations of the values of strains by observing the isochromatic lines. The two polarizers used may include two linear or two circular polarizers, having their axes parallel or at right angles, thereby providing a means of performing the various conventional photoelastic tests without requiring any auxiliary measuring apparatus.

Figure 2:
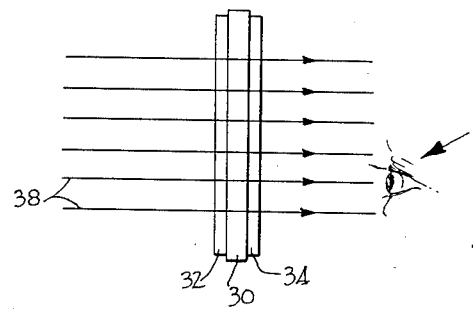
FIG. 2 is a second embodiment in side elevation.

FIG. 2 illustrates such an assembly comprising a transparent photoelastic plate 30 having a sheet 32 of polarizing material bonded to one of its sides and another sheet of polarizing material 34 bonded to its other side. With this embodiment tests are performed by observing, as indicated by an observer's eye shown at 36, the light rays 38 traversing the assembly.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

The method of stress-strain analysis of a plurality of plane workpieces defined by given outlines and subjected to given plane loads, which method comprises the steps of substantially coextensively laminating a uniform thickness photoelastic sheet material with a uniform thickness circularly polarizing sheet material in its isotropic condition over one surface and with a reflective coating over the other surface of the photoelastic material, to form a blank for field use and constituting unitary combination photoelastic model means and photoelastic polariscope means having an area greater than that of the workpieces, thereafter cutting a plurality of models having the thickness of the blank from the blank according to the given outlines, loading the models according to the respective plane loads, and directing light through the polarizing material and the photoelastic material to the reflective coating and back out of the photoelastic material through the polarizing material, whereby visible patterns of birefringence relatable to the stress-strain reactions of the given workpieces to the given loads may be produced in the field in ordinary light with minimum auxiliary apparatus.

References Cited by the Examiner

UNITED STATES PATENTS

| | | | |
|---|---|---|---|
| 2,415,436 | 2/47 | Maris | 88—14 |
| 2,625,850 | 1/53 | Stanton | 88—14 |
| 2,730,007 | 1/56 | Chapman | 88—14 |
| 2,744,156 | 5/56 | Toulon. | |
| 2,882,631 | 4/59 | Boone | 88—65 X |

OTHER REFERENCES

Bucky et al.: Centrifugal Method of Testing Models, Civil Engineering, vol. 5, No. 5, May 1935, pages 287–290.

JEWELL H. PEDERSEN, *Primary Examiner.*